(12) United States Patent
Yamada

(10) Patent No.: US 9,403,436 B1
(45) Date of Patent: Aug. 2, 2016

(54) LANE KEEP ASSIST SYSTEM HAVING AUGMENTED REALITY INDICATORS AND METHOD THEREOF

(71) Applicant: Honda Motor Co., Ltd., Tokyo (JP)

(72) Inventor: Hajime Yamada, Rancho Palos Verdes, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/620,522

(22) Filed: Feb. 12, 2015

(51) Int. Cl.
*B60Q 1/00* (2006.01)
*B60K 35/00* (2006.01)

(52) U.S. Cl.
CPC ......... *B60K 35/00* (2013.01); *B60K 2350/1076* (2013.01); *B60K 2350/2052* (2013.01)

(58) Field of Classification Search
CPC ........... G02B 27/01; G02B 2027/0159; G02B 2027/0183; G02B 2027/0187; G02B 27/0101; B60K 35/00; B60K 2350/2052; B60K 2350/924; B60Q 1/2665; B60Q 1/38; B60Q 1/50; B60Q 1/34; B60Q 1/44; B62D 15/027
USPC .............. 340/435, 439, 932.2, 575, 576, 444, 340/447, 438, 461, 465, 466
See application file for complete search history.

(56) References Cited

U.S. PATENT DOCUMENTS

| | | | |
|---|---|---|---|
| 5,323,152 A * | 6/1994 | Morita | G01S 19/49 340/988 |
| 5,786,772 A | 7/1998 | Schofield | |
| 6,129,025 A * | 10/2000 | Minakami | B60L 5/005 104/288 |
| 6,434,486 B1 * | 8/2002 | Studt | 180/169 |
| 6,559,761 B1 | 5/2003 | Miller et al. | |
| 6,727,807 B2 | 4/2004 | Trajkovic et al. | |
| 7,355,524 B2 | 4/2008 | Schofield | |
| 7,719,431 B2 * | 5/2010 | Bolourchi | B60K 28/066 340/439 |
| 8,174,375 B2 | 5/2012 | Fong et al. | |
| 8,384,531 B2 | 2/2013 | Szczerba et al. | |
| 8,384,532 B2 | 2/2013 | Szczerba et al. | |
| 8,587,649 B2 | 11/2013 | Lo et al. | |
| 2006/0284839 A1 * | 12/2006 | Breed | B62D 1/046 345/156 |
| 2009/0225434 A1 | 9/2009 | Nicholas et al. | |
| 2010/0039292 A1 * | 2/2010 | Scherl | B62D 15/027 340/932.2 |
| 2011/0202240 A1 * | 8/2011 | Rottner | B60Q 1/484 701/42 |
| 2012/0259515 A1 * | 10/2012 | Freienstein | B60R 21/0132 701/46 |
| 2013/0253767 A1 * | 9/2013 | Lee | B60W 50/04 701/42 |
| 2014/0266656 A1 | 9/2014 | Ng-Thow-Hing et al. | |

OTHER PUBLICATIONS

Tran et al., "A Left-Turn Driving Aid Using Projected Oncoming Vehicle Paths with Augmented Reality", 5th International Conference on Automotive User Interfaces and Interactive Vehicular Applications (AutomotiveUI ,13), Oct. 28, 2013, Eindhoven, The Netherlands.

"Continental Head-up Display Augmented Reality HUD", Continental Automotive GmbH, 2014.

"Continental Gives First Look at Augmented Reality Head-Up Display for Improved Driver Information", Continental Corporation, Jul. 14, 2014.

Howard, "2015 Hyundai Genesis review: The best tech midsize car at the best price, bar none", ExtremeTech, Apr. 7, 2014.

* cited by examiner

*Primary Examiner* — Daniel Previl
(74) *Attorney, Agent, or Firm* — Honda Patents & Technologies North America, LLC; Aaron C Fong

(57) ABSTRACT

A vehicle having a head-up display for a lane keep assist system showing augmented reality indicators is provided. The vehicle determines a direction of travel and displays the augmented reality indicators on the head-up display represented at tire positions within the vehicle and angled in the direction of travel.

20 Claims, 7 Drawing Sheets

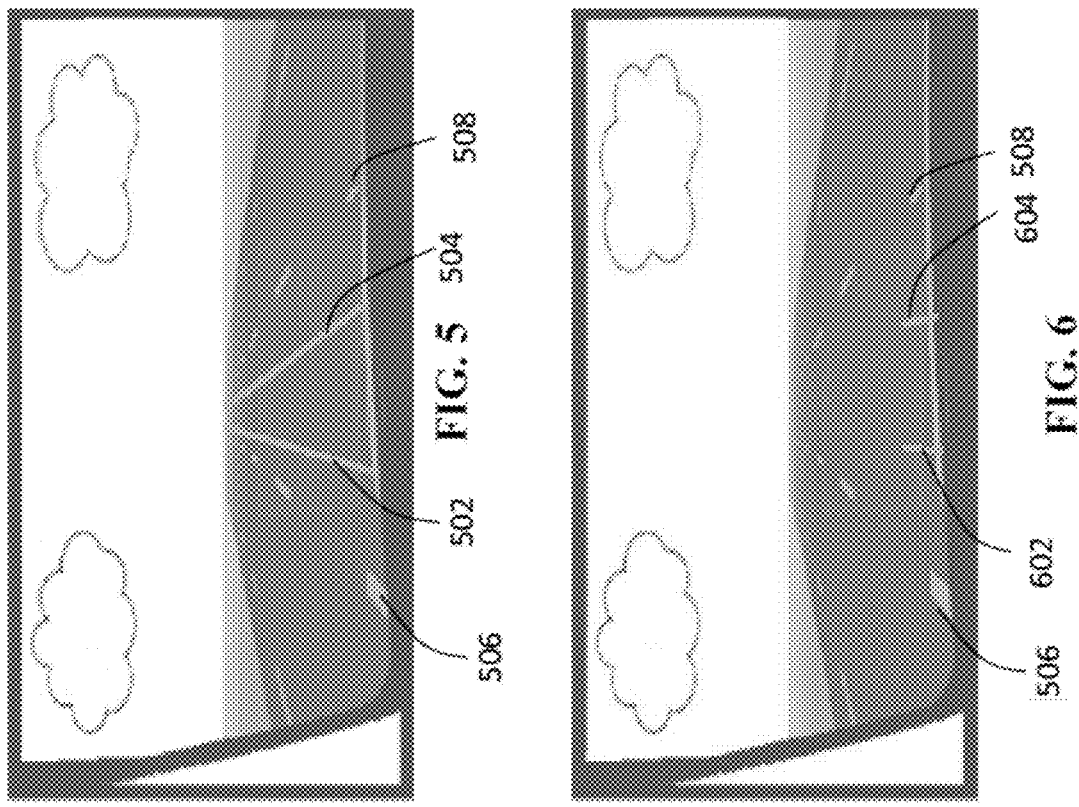
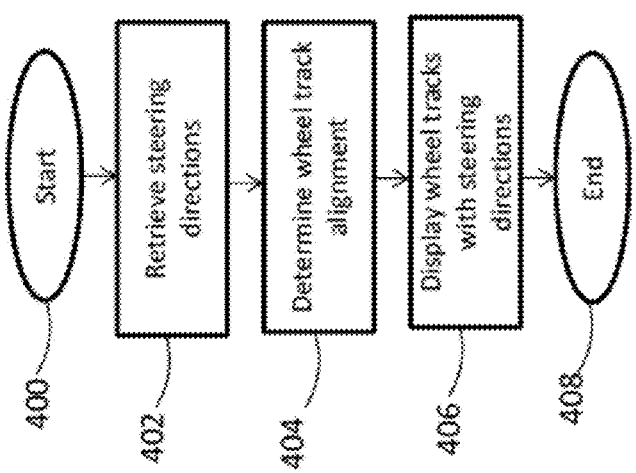

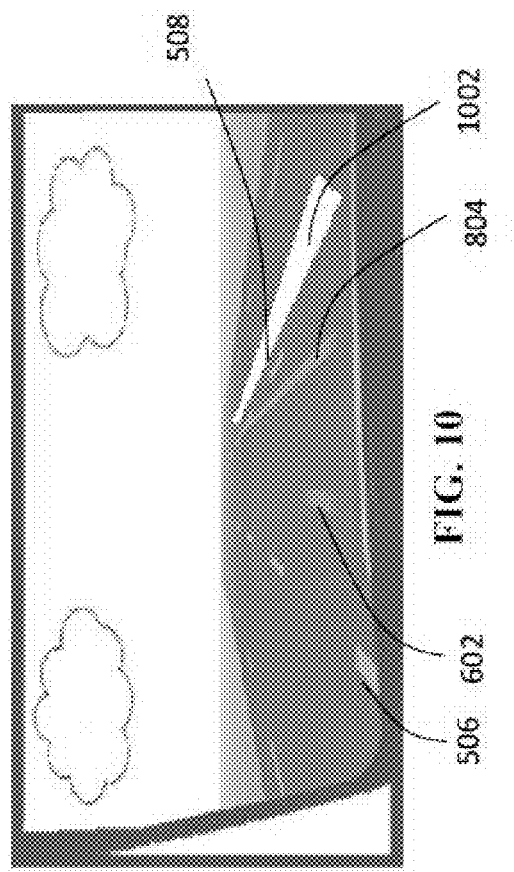

LANE KEEP ASSIST SYSTEM HAVING AUGMENTED REALITY INDICATORS AND METHOD THEREOF

BACKGROUND

Automobile manufacturers have recently begun to include lane keep assist systems in their car designs in an attempt to mitigate driver error. These systems are designed to alert a driver when it detects that the vehicle is about to deviate from a traffic lane. Alerts are often provided to the driver in the form of haptic or audio feedback.

Lane keep assist systems, however, have drawbacks. For example, providing haptic or audio feedback is often times too late, occurring well after the driver has already steered into a neighboring lane. Furthermore, the driver may not understand the purpose of the feedback. As a result, augmented reality indicators for a lane keep assist system and method is needed.

BRIEF DESCRIPTION

According to one aspect of the present disclosure, a method for alerting a driver of a vehicle deviating from a lane is provided. The method includes determining a steering angle of the vehicle, determining a projected path based on the steering angle, displaying augmented reality indicators on a head-up display represented as wheel tracks of the vehicle in a direction of the steering angle, and providing an alert notification through the augmented reality indicators on the head-up display when the projected path crosses the lane.

According to another aspect of the present disclosure, a lane keep assist system of a vehicle is provided. The system includes a head-up display, at least one processor, and a memory operatively coupled to the processor, the memory storing program instructions that when executed by the processor, causes the processor to perform processes. The processes include determining a direction of travel and displaying augmented reality indicators on the head-up display represented at tire positions within the vehicle and angled in the direction of travel.

According to yet another aspect of the present disclosure, a vehicle is provided. The vehicle includes an angle monitor determining a steering angle and a head-up display depicting augmented reality indicators represented at tire positions on the vehicle and angled in the direction of the steering angle.

BRIEF DESCRIPTION OF DRAWINGS

The novel features believed to be characteristic of the disclosure are set forth in the appended claims. In the descriptions that follow, like parts are marked throughout the specification and drawings with the same numerals, respectively. The drawing FIGURES are not necessarily drawn to scale and certain FIGURES can be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

FIG. 4 is a flow chart illustrating exemplary processes for displaying augmented reality indicators for the lane keep assist system in accordance with one aspect of the present disclosure;

FIG. 5 is an illustrative point-of-view showing exemplary elongated augmented reality indicators for the lane keep assist system in accordance with one aspect of the present disclosure;

FIG. 6 is an illustrative point-of-view showing exemplary augmented reality indicators shortened to show wheel tracks in accordance with one aspect of the present disclosure;

FIG. 10 is an illustrative point-of-view showing exemplary augmented reality indicators indicating a blind spot warning in accordance with one aspect of the present disclosure.

DESCRIPTION OF THE DISCLOSURE

Figure 1:
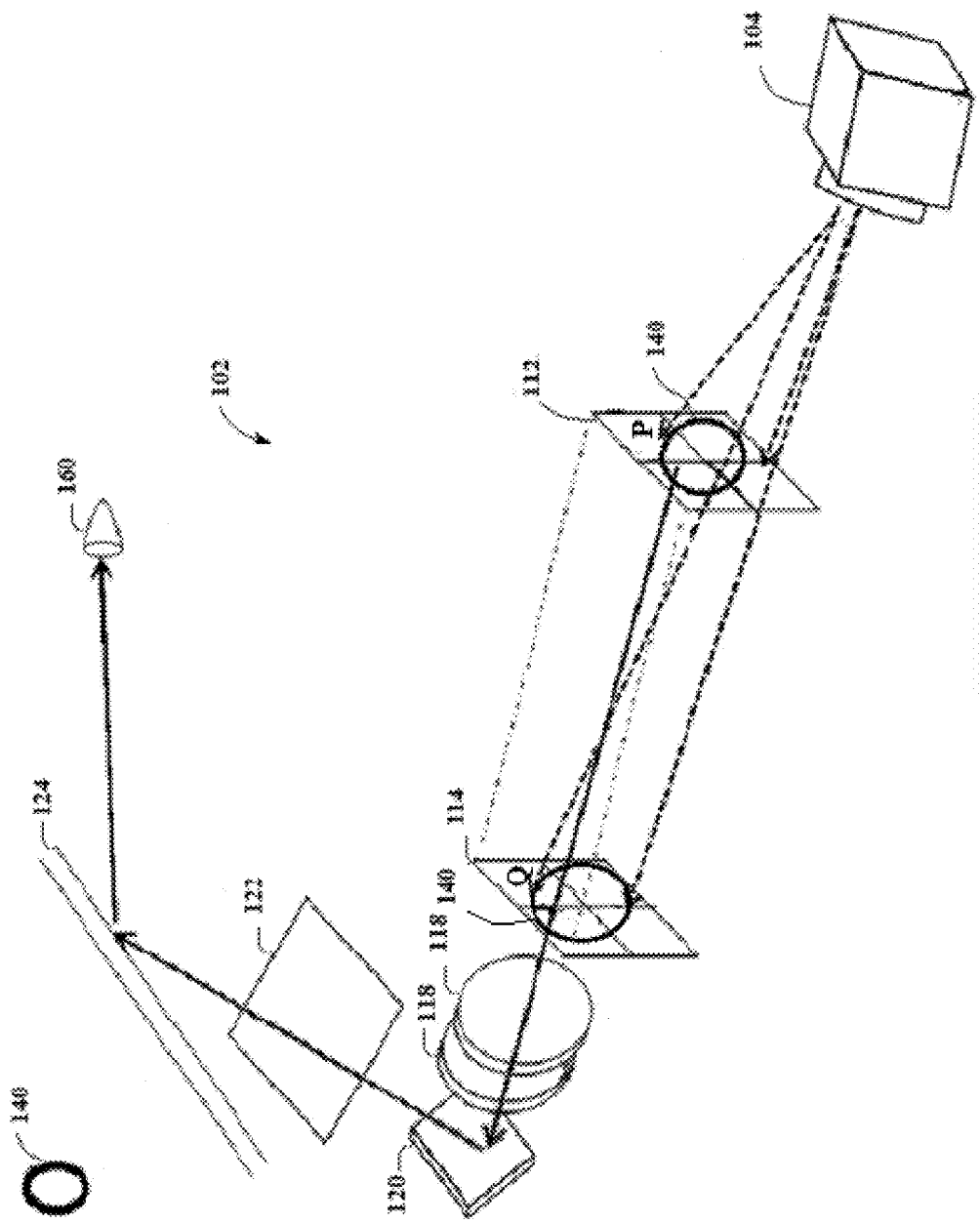
FIG. 1 is an illustrative block diagram depicting an exemplary head-up display for showing augmented reality indicators for a lane keep assist system in accordance with one aspect of the present disclosure.

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

The following includes definitions of selected terms employed herein. The definitions include various examples and/or forms of components that fall within the scope of a term and that can be used for implementation. The examples are not intended to be limiting.

A "bus," as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others.

"Computer communication," as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

A "processor," as used herein, includes, but is not limited to a device that can process signals and perform general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "memory," as used herein, can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device. Memory can be operatively coupled to the processor. The memory can store program instructions that can be executed by the processor.

A "disk," as used herein, can be a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

An "operable connection" or a connection by which entities are "operably connected," as used herein, is one in which signals, physical communications, and/or logical communications can be sent and/or received. An operable connection can include a wireless interface, a physical interface, a data interface, and/or an electrical interface.

Generally described, the systems and methods provided herein are directed to content provided on a vehicle head-up display. The content, according to one exemplary embodiment, can be augmented reality indicators for a lane keep assist system on a head-up display. The head-up display can depict the augmented reality indicators as wheel tracks along with steering directions of the vehicle. Predictions can be made as to whether the vehicle will deviate outside a vehicle's traffic lanes. Based on these predictions, or actual crossing of the lane markers, alert notifications can be displayed through the augmented reality indicators on the head-up display. Blind spot warnings can also be represented through the augmented reality indicators.

A number of advantages can be provided using the systems and methods described herein. Driver distraction can be reduced through the head-up display as it focuses the driver's attention directly in front of them. These visual cues have shown better performance than audio or haptic feedback systems alone. Visual cues can also provide better response times as well. Advantageously, the augmented reality indicators can provide tire positions, cueing a driver into their actual location within a lane. Other advantages will become apparent from the description provided below.

Figure 3:
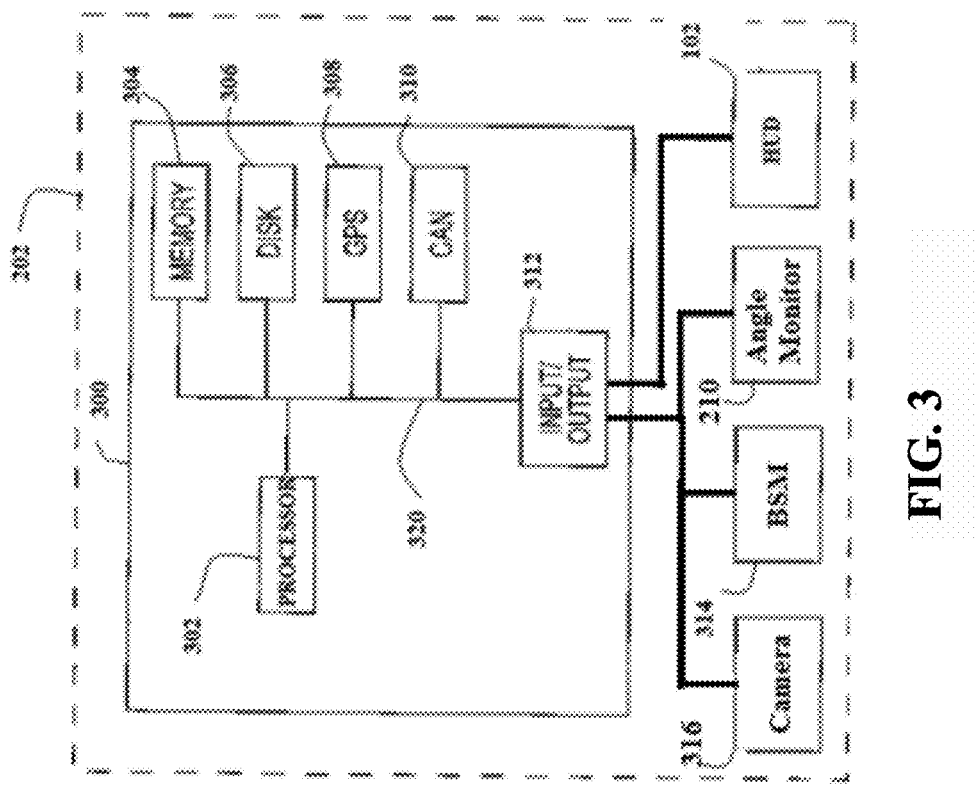
FIG. 3 is an illustrative block diagram depicting exemplary components for the lane keep assist system in accordance with one aspect of the present disclosure.
Figure 2:
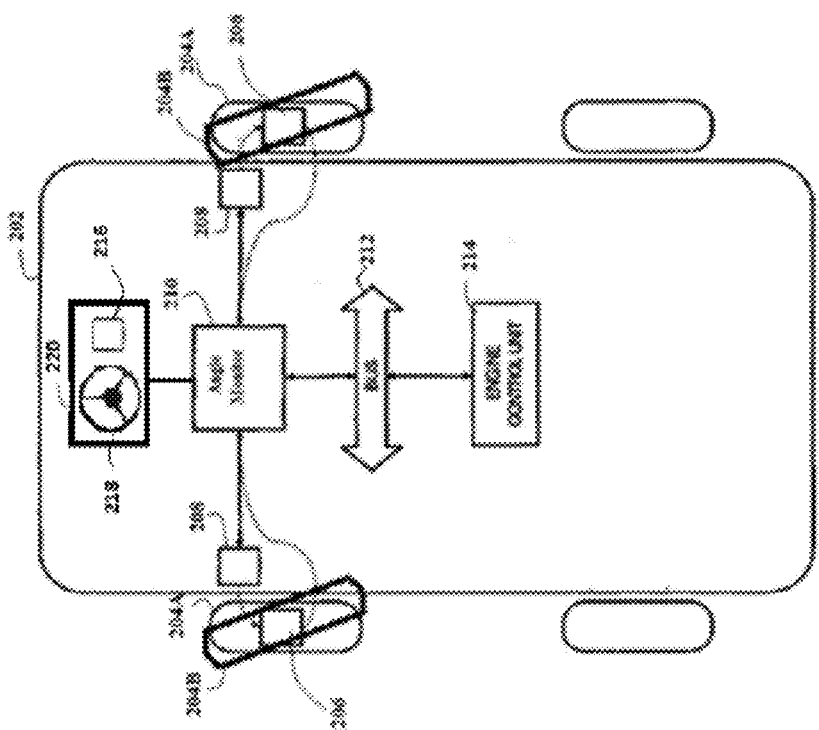
FIG. 2 is an illustrative block diagram depicting an exemplary angle monitor within a vehicle for the lane keep assist system in accordance with one aspect of the present disclosure.
Figure 7:
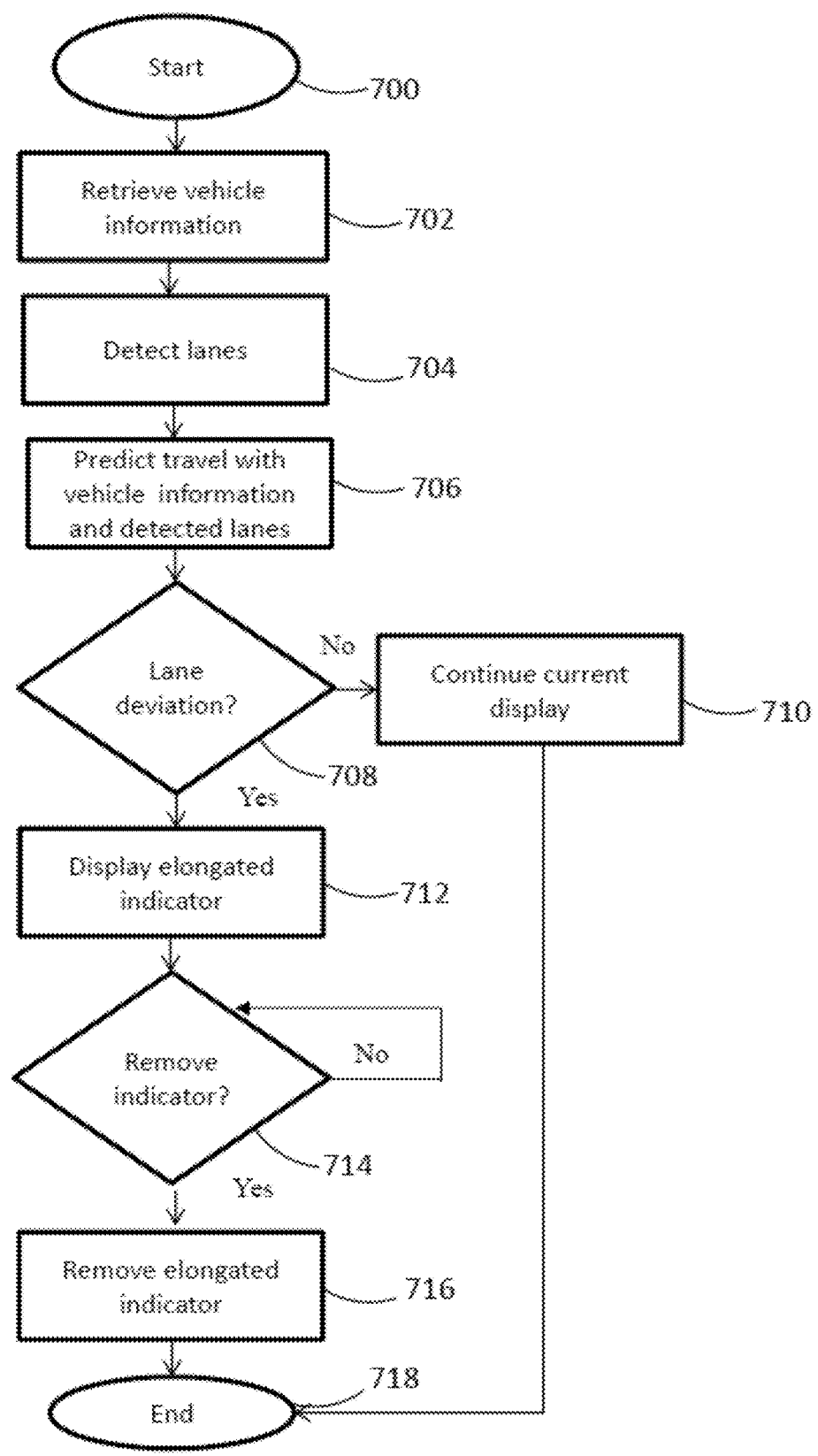
FIG. 7 is a flow chart illustrating exemplary processes for displaying augmented reality indicators for lane departure forecasts in accordance with one aspect of the present disclosure.
Figure 8:
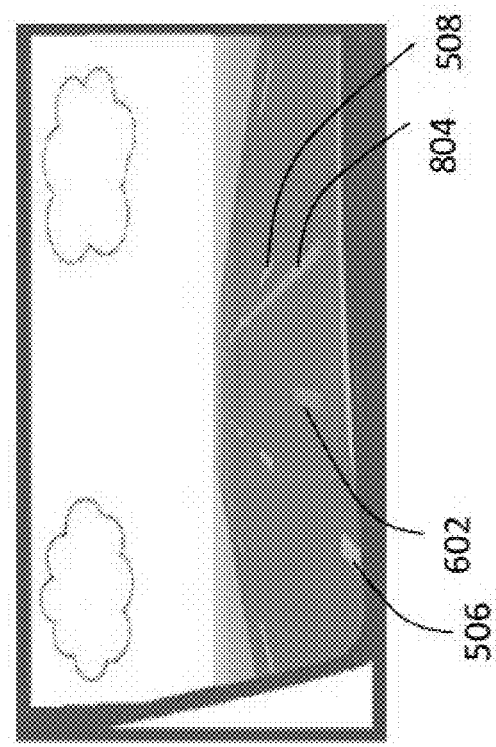
FIG. 8 is an illustrative point-of-view showing an exemplary augmented reality indicator indicating a lane departure in accordance with one aspect of the present disclosure.
Figure 9:
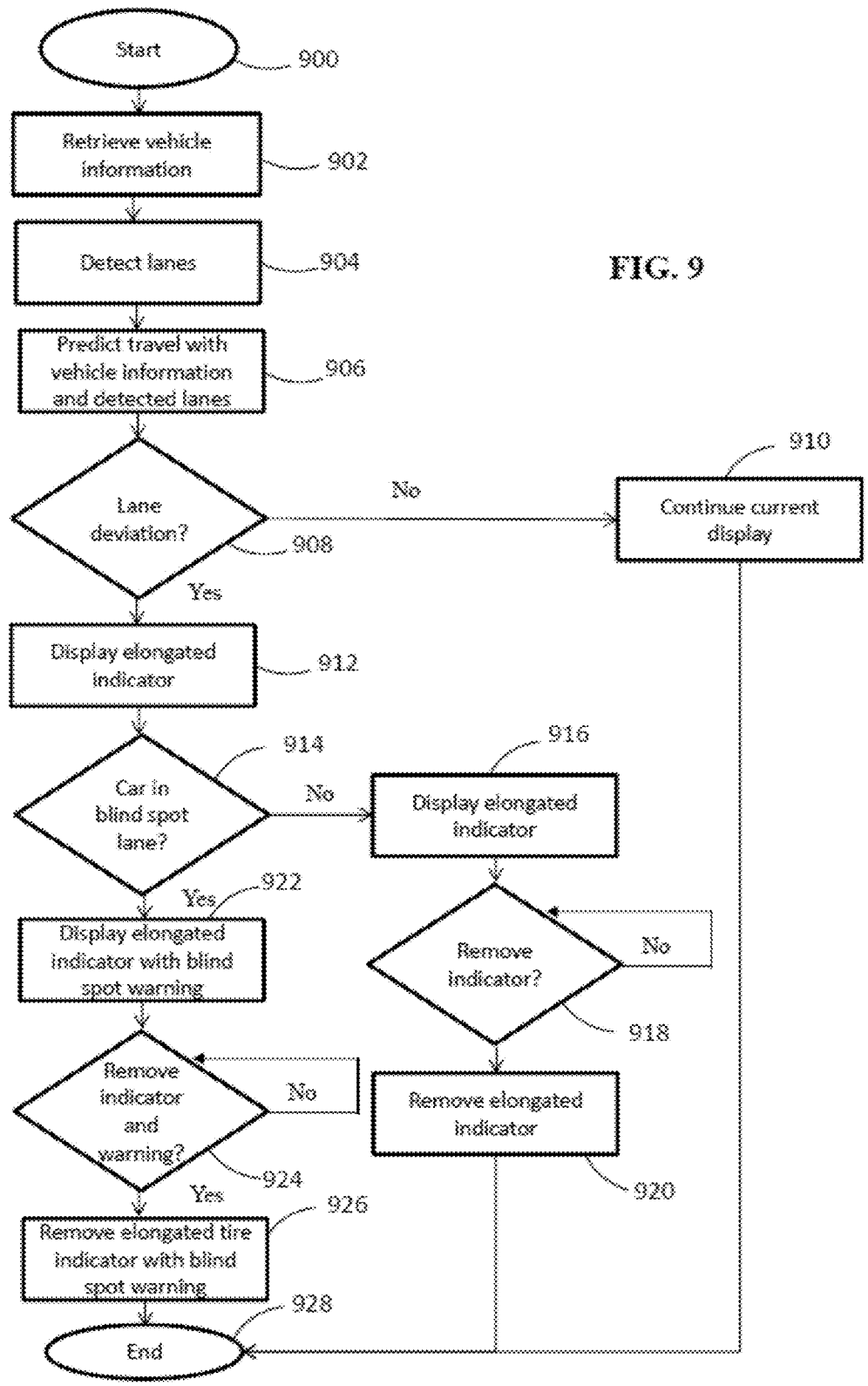
FIG. 9 is a flow chart illustrating exemplary processes for displaying augmented reality indicators for blind spot warnings in accordance with one aspect of the present disclosure.

While the augmented reality indicators are shown as being wheel tracks, other types of indicia can be used and is not limited to those described herein. For example, the indicators can take the form of skis. With reference to the FIGURES, FIGS. 1 through 3 depict an exemplary head-up display along with illustrative hardware for the lane keep assist system. FIGS. 4 through 6 represent tire arrangements, while FIGS. 7 and 8 show lane departure forecasts. FIGS. 9 and 10 depict a blind spot warning.

Turning now to FIG. 1, an illustrative block diagram depicting an exemplary head-up display 102 for showing augmented reality indicators for a lane keep assist system in accordance with one aspect of the present disclosure is provided. The display 102 can include fewer or additional components and is not restricted to those shown. Furthermore, a number of other systems exist that can provide images showing augmented reality content. The display 102 should not be construed as limiting, but has been provided for illustrative purposes.

The head-up display 102, which can also be referred to as an augmented reality head-up display, can show three-dimensional content or images. The display 102 can provide three-dimensional graphics on a ground plane. Other displays exist, but the configuration shown typically does not provide images above the ground plane so that it focuses a driver's attention in front of them to remove driver distractions. The display 102, as will become apparent below, can provide a number of different focal planes when a single plane is shifted.

As shown, the head-up display 102 can include a projector 104. The projector 104 can provide vertical images 140. Each of these images 140 can be provided in front of a driver's point-of-view 160 such that the images 140 are perceived to be outside a vehicle's windshield 124.

A vertical image 140 can be projected to a vertical plane that shifts between Plane P 112 and Plane Q 114. The vertical plane can be a single piece that moves forwards and backwards at a rapid pace along the horizontal plane 150. The quick movement of the vertical plane creates an image by generating multiple focal planes using the single piece. The distance that the vertical piece moves can be small allowing quicker movements to create the volumetric image. The image within the projector 104 can be constantly changed to adjust focus and size of the vertical image 140 to take into account the changes in distances of the vertical plane as it traverses from Plane P 112 to Plane Q 114 rapidly.

Continuing with FIG. 1, the head-up display 102 can include a pair of lenses 118. The lenses 118 can be used to magnify the vertical image 140 as the distance changes between Plane P 112 and Plane Q 114. After passing through the lenses 118, the vertical image 140 can be redirected through at least one mirror 120 outside the dashboard 122. The image 140 can then be projected to the front windshield 124. The configuration shown can provide images on the ground plane which are shown as three-dimensional graphics.

The head-up display 102, described above, can be used with the lane keep assist system to provide augmented reality indicators. FIG. 2 is an illustrative block diagram depicting an exemplary angle monitor 210 within a vehicle 202 for the lane keep assist system in accordance with one aspect of the present disclosure. Fewer or more components can be used to capture the information for the lane keep assist system and the described embodiment should not be construed as limiting.

An angle monitor 210 of the vehicle 202 can be used to determine the steering direction or the angle of the wheels on a vehicle 202. The angle of the tires can be measured through a number of different systems and is not limited to the system shown. In one embodiment, a sensor 206 within the wheel can communicate with a receiver 208 of the vehicle 202. Through the sensor 206 and receiver 208, a tire angle or steering direction can be determined. For example, the angle monitor 210 can determine whether the tires are in position 204A or position 204B. After the angle monitor 210 determines the steering direction, this information can be provided to the lane keep assist system. Speed information, as well as other data, can also be monitored and provided.

In one embodiment, the angle monitor 210 can detect the angle of the tires through sensors 216 on the steering column 218. These can be part of the electric power steering system 220 that assists the driver of a vehicle to steer their vehicle. One or more sensors 216 can be associated with the electric power steering system 220. By using the system, steering directions can be monitored more closely with the driver's intentions.

The information can be directed to the bus 212 and communicated with other systems in the vehicle 202 such as the engine control unit 214 and the lane keep assist system 300 shown in FIG. 3. FIG. 3 is an illustrative block diagram depicting exemplary components for the lane keep assist system 300 in accordance with one aspect of the present disclosure. The system 300 can process steering directions and provide output to the head-up display 102 through volumetric content. The lane keep assist system 300 can include fewer or more components and are not limited to those shown.

The lane keep assist system 300 within the vehicle 202 can include a processor 302, memory 304, disk 306, global positioning system 308, controller area network data 310 and an input/output interface 312, which can communicate through a bus 320. The input/output interface 312 can communicate with the angle monitor 210 and in addition, a blind spot monitor 314 and cameras 316. Blind spot monitors 314 can be provided in the vehicle 202, and according to one embodiment, detect neighboring vehicles in adjacent lanes. Cameras 316 can be used to detect lanes in front of the vehicle 202. Fewer or more types of sensors can be provided and are not limited to those described. The input/output interface 312 can also communicate with the head-up display 102 to provide augmented reality indicators for the lane keep assist system 300.

The lane keep assist system 300 can include a global positioning system 308 which can determine the location of the vehicle 202. The global positioning system 308 can be embedded into the lane keep assist system 300 or be provided through a separate system. The global positioning system 308, in addition to mapping information which can be stored locally or separately, can be used with the lane keep assist system 300 to correlate traffic lane information with the head-up display 102. Controller area network data 310 can be retrieved from the sensors on the vehicle 202. The data can be processed and provided as output through the head-up display 102.

As will be shown in the following FIGURES, the lane keep assist system 300 can provide augmented reality indicators or markers that are presented on a head-up display 102. The indicators can be utilized to allow a driver of a vehicle 202 to drive in the middle of the road without getting too close to traffic lanes. The indicators on the head-up display 102 can be represented at tire positions within or on the vehicle 202 and angled in the direction of travel. The tire positions can represent where the tires of the vehicle 202 are in relation to the driver. As will be shown the indicators can take the form of wheel tracks.

FIG. 4 is a flow chart illustrating exemplary processes for displaying augmented reality indicators for the lane keep assist system 300 in accordance with one aspect of the present disclosure. The processes can begin at block 400. At block 402, the lane keep assist system 300 can retrieve steering directions of the vehicle 202 from the angle monitor 210. Other types of devices can be used, for example, directly taking input from the steering wheel as discussed earlier. The system 300 can determine wheel track alignment at block 404. This can include determining the position of the wheels of the vehicle 202 in relation to the head-up display 102. Typically, positioning can be set to the driver's point-of-view. The wheel tracks can be adjusted for different types of drivers. At block 406, the lane keep assist system 300 can provide wheel tracks along with the steering directions on the head-up display 102. The processes can end at block 408.

As shown in FIG. 5, the lane keep assist system 300 can generate and present elongated indicators 502 and 504 in order for the driver to follow in the middle of their lanes 506 and 508 without getting too close to the lane markers. In one embodiment, the elongated indicators 502 and 504 can be provided as augmented reality images extending to a point beyond a line of sight. These elongated indicators 502 and 504 can be shown at initialization and be reduced to those shown in FIG. 6, which provides them as indicators 602 and 604. Alternatively, the elongated indicators 502 and 504 can be shown constantly within the lane markers 506 and 508.

In FIG. 6, a left indicator 602 and a right indicator 604 are provided. The indicators 602 and 604 can represent the tire positions on the vehicle 202. The indicators 602 and 604 can be positioned on the head-up display 102 such that they align with the tires of the vehicle 202. For purposes of illustration, the driver of the vehicle 202 would try to keep the indicators 602 and 604 between and aligned with the lane markers 506 and 508.

FIG. 7 is a flow chart illustrating exemplary processes for displaying augmented reality indicators for lane departure forecasts in accordance with one aspect of the present disclosure. Fewer or additional processes can be used for lane departure forecasts. The processes can begin at block 700. At block 702, the lane keep assist system 300 can retrieve vehicle information. This information can include, but is not limited to, steering directions and whether the turn signals have been activated, which can be retrieved from the controller area network data 310.

At block 704, the lane keep assist system 300 can detect lanes. As described previously, sensors connected with the system 300 can be used, for example, cameras 316. The system 300, at block 706, can predict the vehicle's travel through the retrieved vehicle information and detected lanes, for example, the steering directions of the vehicle 202.

At decision block 708, the lane keep assist system 300 can determine whether there is a potential lane departure. The system 300 can determine whether there is a lane departure by extending imaginary lines out of the wheel tracks and calculating whether at least one of the imaginary lines intersect a lane 506 or 508. In one embodiment, a lane departure can occur if the imaginary lane crosses into the lane 506 or 508 within a predetermined distance, such as ten feet. If not, and at block 710, the indicators 602 and 604 can continue to be displayed on the head-up display 102 without providing a warning. At block 712, and if there has been a detected lane departure, an elongated tire track can be displayed on the head-up display 102. The processes can end at block 718.

At decision block 714, the lane keep assist system 300 can determine whether the elongated indicator can be removed. The elongated indicator can be removed once the driver is no longer veering out of their lane or after a predetermined amount of time. If the indicator should not be removed, the system 300 returns back to decision block 714. When conditions are met, at block 716, the elongated indicator is removed and conditions are returned back to normal. In one embodiment, when the driver's turn signals are on, extending the indicators can be turned off. This information can be determined from the controller area network data 310. The processes can end at block 718.

FIG. 8 is an illustrative point-of-view showing the exemplary augmented reality indicator 804 indicating a lane departure in accordance with one aspect of the present disclosure. The right indicator 804 can show that the right wheel track is going to, or has, veered out of its traffic lane 508. By extending the indicator 804, the head-up display 102 can provide visual cues and imagery to alert the driver. The left indicator 602 can be extended as well if the vehicle 202 were going to, or has, crossed into the left traffic lane 506.

FIG. 9 is a flow chart illustrating exemplary processes for displaying augmented reality indicators for blind spot warnings in accordance with one aspect of the present disclosure. At block 900, the processes can begin. Fewer or additional, processes can be used to display blind spot warnings. At block 902, the lane keep assist system 300 can retrieve vehicle information. This information can include, but is not limited to, steering directions.

At block 904, the lane keep assist system 300 can detect lanes. As described previously, sensors connected with the system 300 can be used, for example, cameras 316. The system 300, at block 906, can predict the vehicle's travel through the retrieved vehicle information and detected lanes, for example, the steering directions of the vehicle 202.

At decision block 908, the lane keep assist system 300 can determine whether there is a potential lane departure. The system 300 can determine whether there is a lane departure by extending imaginary lines out of the wheel tracks and calculating whether at least one of the imaginary lines intersect a traffic lane 506 or 508. In one embodiment, a lane departure can occur if the imaginary lane crosses into the lane 506 or 508 within a predetermined distance, such as ten feet. If not, and at block 910, the indicators 602 and 604 can continue to be displayed on the head-up display 102 without providing a warning. At block 928, the processes can end.

At block 912, if there is a detected or anticipated lane departure, an elongated indicator can be displayed on the head-up display 102. At decision block 914, the lane keep assist system 300 can determine whether there is a neighboring vehicle in the lane 506 or 508 to be crossed. Blind spot monitors 314 can be used to determine this information.

When there are no vehicles in the blind spot, at block 916, the system 300 can display the elongated indicator indicating a lane deviation. At decision block 918, the lane keep assist system 300 can determine whether the elongated indicator can be removed. The elongated indicator can be removed once the driver is no longer veering out of their lane or after a predetermined amount of time. If the indicator should not be removed, the system 300 returns back to decision block 918. When conditions are met, at block 920, the indicator is removed. In one embodiment, when the driver's turn signals are on, extending the indicators can be turned off. The processes can end at block 928.

At block 922, and if there is a car in the driver's blind spot, the elongated indicator is provided with a blind spot warning. At decision block 924, the lane keep assist system 300 can determine whether the elongated indicator can be removed. The elongated indicator can be removed once the driver is no longer veering out of their lane or after a predetermined amount of time. The blind spot indicator can be removed if no vehicle is detected in a neighboring lane through the blind spot monitor 314. In one embodiment, the color of the augmented reality indicator can change reflecting a speed of the neighboring vehicle. If the indicator and warning should not be removed, the system 300 returns back to decision block 924. When conditions are met, at block 926, the indicator along with the blind spot warning is removed. The processes can end at block 928.

FIG. 10 is an illustrative point-of-view showing the exemplary augmented reality indicators indicating a blind spot warning 1002 in accordance with one aspect of the present disclosure. The warning 1002 can be provided along with the left indicator 602 and the right indicator 804 showing that the right wheel track is going to, or has, veered out of its traffic lane 508. The warning 1002 can be in the form of a color change or other indicia indicating to the user that a car is in their blind spot. The color can reflect a speed of the neighboring vehicle as detected by the blind spot monitor 314. Similar content could be shown if the vehicle 202 veers outside the left lane 506.

The data structures and code, in which the present disclosure can be implemented, can typically be stored on a non-transitory computer-readable storage medium. The storage can be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the disclosure can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium. Furthermore, the methods and processes described can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The technology described herein can be implemented as logical operations and/or modules. The logical operations can be implemented as a sequence of processor-implemented executed steps and as interconnected machine or circuit modules. Likewise, the descriptions of various component modules can be provided in terms of operations executed or effected by the modules. The resulting implementation is a matter of choice, dependent on the performance requirements of the underlying system implementing the described technology. Accordingly, the logical operations making up the embodiment of the technology described herein are referred to variously as operations, steps, objects, or modules. It should be understood that logical operations can be performed in any order, unless explicitly claimed otherwise or a specific order is inherently necessitated by the claim language.

Various embodiments of the present disclosure can be programmed using an object-oriented programming language, such as SmallTalk, Java, C++, Ada or C#. Other object-oriented programming languages can also be used. Alternatively, functional, scripting, and/or logical programming languages can be used. Various aspects of this disclosure can be implemented in a non-programmed environment, for example, documents created in HTML, XML, or other format that, when viewed in a window of a browser program, render aspects of a GUI or perform other functions. Various aspects of the disclosure can be implemented as programmed or non-programmed elements, or any combination thereof.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A method for alerting a driver of a vehicle deviating from a lane comprising:
   determining a steering angle of the vehicle;
   determining a projected path based on the steering angle;
   displaying augmented reality indicators on a head-up display represented as wheel tracks of the vehicle in a direction of the steering angle; and
   providing an alert notification through the augmented reality indicators on the head-up display when the projected path crosses the lane.

2. The method of claim 1, comprising initializing the augmented reality indicators by extending the augmented reality indicators to a point beyond a line of sight.

3. The method of claim 1, wherein determining the steering angle of the vehicle comprises retrieving vehicle data from an angle monitor.

4. The method of claim 1, wherein determining the projected path based on the steering angle comprises extending imaginary lines out of the wheel tracks.

5. The method of claim 1, wherein displaying the augmented reality indicators on the head-up display represented as the wheel tracks of the vehicle in the direction of the steering angle comprises aligning the wheel tracks with tire positions on the vehicle.

6. The method of claim 1, wherein providing the alert notification through the augmented reality indicators on the head-up display when the projected path crosses the traffic lane comprises extending an augmented reality indicator on the head-up display.

7. The method of claim 1, wherein providing the alert notification through the augmented reality indicators on the head-up display when the projected path crosses the traffic lane comprises providing a blind spot warning when a neighboring vehicle is approaching.

8. A lane keep assist system of a vehicle comprising:
   a head-up display;
   at least one processor; and
   a memory operatively coupled to the processor, the memory storing program instructions that when executed by the processor, causes the processor to:
   determine a direction of travel;
   display augmented reality indicators on the head-up display represented at tire positions within the vehicle and angled in the direction of travel.

9. The lane keep assist system of claim 8, wherein the head-up display provides three-dimensional graphics on a ground plane.

10. The lane keep assist system of claim 8, comprising an angle motor for determining the direction of travel.

11. The lane keep assist system of claim 8, wherein the augmented reality indicators on the head-up display are depicted as wheel tracks.

12. The lane keep assist system of claim 8, wherein the memory storing program instructions, when executed by the processor, causes the processor to extend an augmented reality indicator on the head-up display when the vehicle is predicted to deviate from the lane.

13. The lane keep assist system of claim 12, wherein the memory storing program instructions, when executed by the processor, causes the processor to highlight the augmented reality indicator when a neighboring vehicle is present.

14. The lane keep assist system of claim 13, wherein the memory storing program instructions, when executed by the processor, causes the processor to change the color of the augmented reality indicator reflecting a speed of the neighboring vehicle.

15. The lane keep assist system of claim 8, wherein the memory storing program instructions, when executed by the processor, causes the processor to display lane guidance markings outside the display augmented reality indicators.

16. A vehicle comprising:
   an angle monitor determining a steering angle; and
   a head-up display depicting augmented reality indicators represented at tire positions on the vehicle and angled in the direction of the steering angle.

17. The vehicle of claim 16, wherein the augmented reality indicators are wheel tracks displayed on a ground plane.

18. The vehicle of claim 16, wherein an augmented reality indicator is extended when a projected path veers into an adjacent lane.

19. The vehicle of claim 16, wherein an augmented reality indicator is highlighted when a neighboring vehicle is in a blind spot.

20. The vehicle of claim 19, wherein the augmented reality indicator changes color of the augmented reality indicator reflecting a speed of the neighboring vehicle.

* * * * *